United States Patent [19]
Fukushima

[11] Patent Number: 6,013,008
[45] Date of Patent: Jan. 11, 2000

[54] STEP COUNT DATA CONTROL SYSTEM, AND ITS OUTPUT MEDIUM AND RECORDING MEDIUM

[76] Inventor: Hironori Fukushima, 6-2, Chayamachi, Kita-ku, Osaka, Japan

[21] Appl. No.: 09/143,779

[22] Filed: Aug. 31, 1998

[30] Foreign Application Priority Data

Apr. 14, 1998 [JP] Japan .................................. 10-102326

[51] Int. Cl.$^7$ .................................................. G01C 22/00
[52] U.S. Cl. .................................... 482/8; 482/3; 482/74; 702/160
[58] Field of Search ............................... 482/1–9, 14, 74, 482/900–902; 377/24.2; 702/160

[56] References Cited

U.S. PATENT DOCUMENTS 4,962,469  10/1990  Ono et al. ............................... 702/160
5,164,967  11/1992  Endo et al. ............................. 377/24.2
5,476,427  12/1995  Fujima .................................... 482/3

*Primary Examiner*—Glenn E. Richman
*Attorney, Agent, or Firm*—Moonray Kojima

[57] ABSTRACT

The invention presents a step count data control system allowing to walk easily and continuously in order to improve health or maintain health, which includes step counting means for counting the number of steps, input means 11 for entering the step count data, recording means 12 for recording daily step count data entered by the input means 11, operating means 14, 15, 16 for operating according to the step count data, and output means 17, 18 for issuing data, in which the step count data entered by the input means 11 and recorded in the recording means 12 is operated in the operating means 14, 15, 16, and the average in a month, the total, the target value in a month, the walking distance converted from the step count, evaluation, past record and its comparison, advice, comment and other data are issued to the output means 17, 18.

4 Claims, 12 Drawing Sheets

| 1998 MARCH | NAME | SEX | AGE | MEMBERSHIP NUMBER | YOUR STEP LENGTH |
|---|---|---|---|---|---|
| | TARO OSAKA | MALE | 40 | 002050 | 60cm |
| | ADDRESS | | | SECTION | TARGET OF A DAY FOR THIS MONTH |
| | | | | | 8500 STEPS |

19a, 19b

| WALKING DATA: STEP COUNT RECORD OF MARCH 1998 ||
|---|---|
| CURRENT MONTH TOTAL: 272,800 STEPS | DAILY AVERAGE OF CURRENT MONTH: 8,800 STEPS |
| CUMULATIVE RECORD FROM JANUARY 1998 TO MARCH 1998 ||
| TOTAL STEPS: 772,800 STEPS | TOTAL DISTANCE: 463.7 km |

| | NAME | SEX | AGE | MEMBERSHIP NUMBER | YOUR STEP LENGTH |
|---|---|---|---|---|---|
| 1998 MARCH | TARO OSAKA | MALE | 40 | 002050 | 60cm |
| | ADDRESS | | | SECTION | TARGET OF A DAY FOR THIS MONTH |
| | | | | | 8500 STEPS |

| WALKING DATA: STEP COUNT RECORD OF MARCH 1998 | DAILY AVERAGE OF CURRENT MONTH: 8,800 STEPS |
|---|---|
| CURRENT MONTH TOTAL: 272,800 STEPS | |
| CUMULATIVE RECORD FROM JANUARY 1998 TO MARCH 1998 | |
| TOTAL STEPS: 772,800 STEPS | TOTAL DISTANCE: 463.7 km |

| COMPARISON WITH PAST RECORD (STEPS/DAY) | SECOND MONTH BACK | TARGET<br>AVERAGE<br>MAXIMUM<br>MINIMUM | ☐☐☐☐☐☐☐☐☐☐ 8,000<br>* * * * * * * * * * * * * 9,000<br>= = = = = = = = = = = = = = 10,000<br># # # # # # # # 6,000 |
|---|---|---|---|
| | LAST MONTH | TARGET<br>AVERAGE<br>MAXIMUM<br>MINIMUM | ☐☐☐☐☐☐☐☐☐☐ 8,000<br>* * * * * * * * * * * * * 8,500<br>= = = = = = = = = = = = = = 9,000<br># # # # # # # # 7,000 |
| | CURRENT MONTH | TARGET<br>AVERAGE<br>MAXIMUM<br>MINIMUM | ☐☐☐☐ ☐☐☐☐☐☐ 8,500<br>* * * * * * * * * * * * 8,800<br>= = = = = = = = = = = = = 10,900<br># # # # # # # # 3,900 |

| WALKING COMMENT |
|---|
| • DAILY WALKING COUNT EVALUATION IS A IN 20 DAYS, B IN 5 DAYS, C IN 3 DAYS, AND D IN 3 DAYS. YOU WALKED MORE CONSTANTLY THAN LAST MONTH. NEXT MONTH, TRY TO MAKE EVALUATION D ZERO.<br><br>• THE DAILY TARGET FOR THIS MONTH OF 8500 STEPS IS SUCCESSFULLY ACHIEVED. THE TARGET FOR NEXT MONTH IS 9000 STEPS.<br>TRY NATURALLY DEPENDING ON YOUR OWN PHYSICAL CONDITION.<br><br>ETC. |

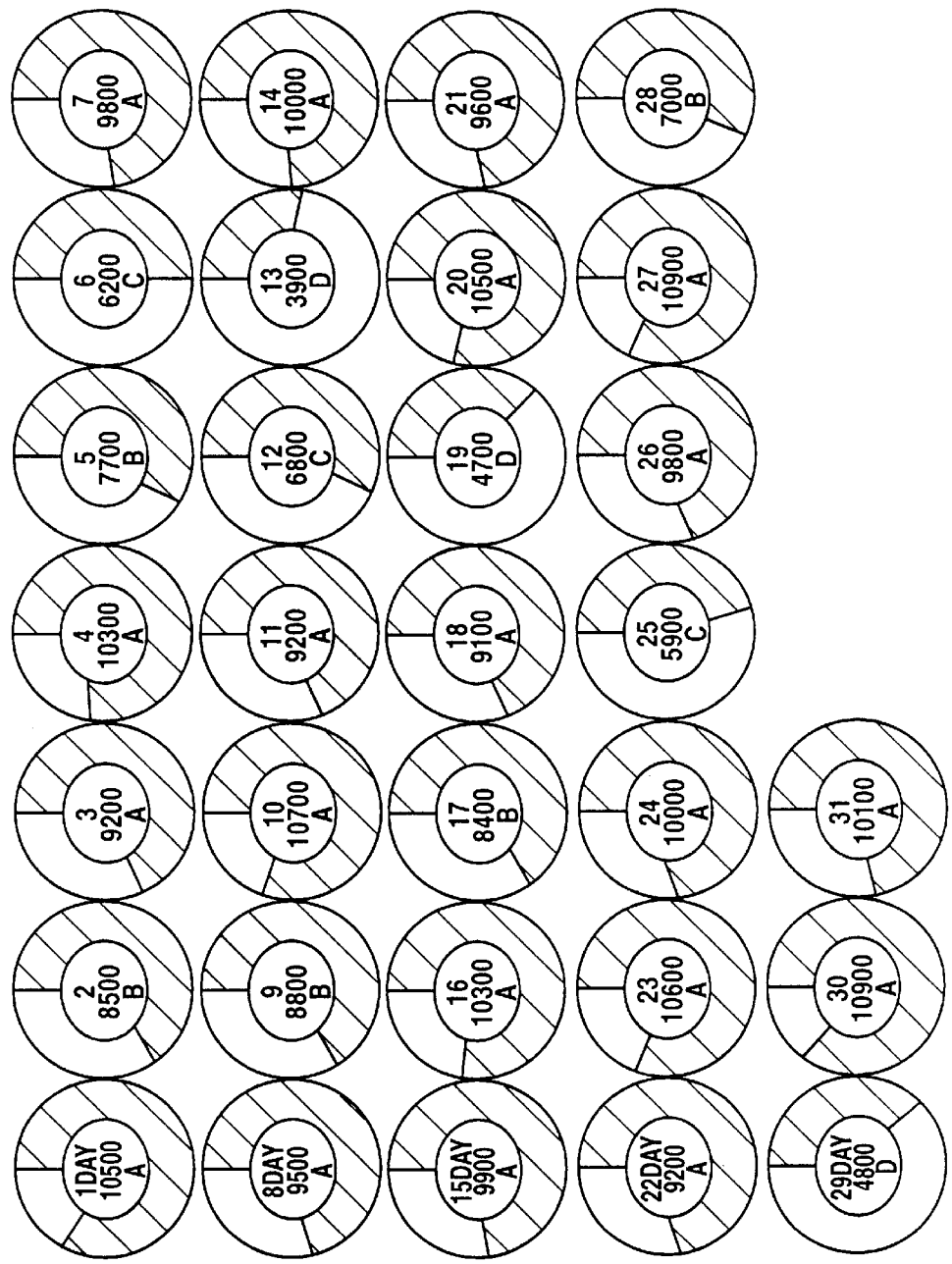

| HEALTH ADVICE FROM EXERCISE INSTRUCTOR |
|---|
| • TAKE IT EASY AND BREATHE ENOUGH WHILE WALKING.<br>• SELECT SHOES OF GOOD CUSHION WHEN WALKING A PAVED ROAD. |

| CHALLENGE TO WALK AROUND JAPAN IN A TOTAL DISTANCE OF 6722 km. |
|---|
| THIS MONTH, YOU'VE PASSED THE CITY OF AA, AND ARE APPROACHING BB.<br>GOOD WALKING. GO ON. |

| 1997 SEPTEMBER | NAME | SEX | AGE | MEMBERSHIP NUMBER | YOUR STEP LENGTH |
|---|---|---|---|---|---|
| | TOMOKO MAMPO | FEMALE | 45 | 002050 | 60cm |
| | ADDRESS | | | SECTION | TARGET OF A DAY FOR THIS MONTH |
| | 6-2 CHAYAMACHI, KITA-KU, OSAKA | | | | 15000 STEPS |

| CHALLENGE TO WALK AROUND JAPAN IN A TOTAL DISTANCE OF 6730 km. |
|---|
| NICE WALKING. RAISE THE TARGET SLIGHTLY FROM NEXT MONTH. |

19i

| ABSOLUTE EVALUATION TABLE |
|---|
| A  ○○○○○○ |
| B  ○○○○○○○○○ |
| C  ○○○○○○○○○○ |
| D  ○○ |
| E  ○○ |

EVALUATION A: 11000 STEPS OR MORE
EVALUATION B: 10999 TO 8500 STEPS
EVALUATION C: 8499 TO 6000 STEPS
EVALUATION D: 5999 TO 3500 STEPS
EVALUATION E: 3499 STEPS OR LESS

| YOUR WALKING DATA: STEP COUNT RECORD OF SEPTEMBER 1997 | | |
|---|---|---|
| CURRENT MONTH TOTAL: 310,800 STEPS | DAILY AVERAGE OF CURRENT MONTH: 10,360 STEPS | FAST WALKING TIME TOTAL OF CURRENT MONTH: 250 MINUTES |
| CUMULATIVE RECORD FROM JANUARY 1997 TO SEPTEMBER 1997 | | |
| TOTAL STEPS: 2,245,000 STEPS | TOTAL DISTANCE: 1,350.1 km | |

| HEALTH ADVICE FROM PROFESSIONAL |
|---|
| • YOUR B.M.I. IS 22.5.<br>YOUR DAILY REQUIRED ENERGY IS 1,870 KCAL.<br><br>• SUPPLY ENOUGH WATER. WHEN HIKING OR WALKING DAILY FOR 30 TO 60 MINUTES, YOU MUST TAKE 300 CC OF WATER |

STEP COUNT DATA CONTROL SYSTEM, AND ITS OUTPUT MEDIUM AND RECORDING MEDIUM

BACKGROUND OF THE INVENTION

1. Field of the Invention

The present invention relates to a step count data control system allowing to walk easily and continuously in order to improve health or maintain health.

2. Prior Art

Along with the change in life style, the importance of walking is emphasized continuously, and many people wear the pedometer in daily life today. With the pedometer, one knows how many steps one has walked this day, and continues efforts by setting the own target step count. People often say they are healthy thanks to such walking habit.

On the other hand, it is also difficult to continue the habit for a long period, and some say, "I bought the pedometer, but . . . " In this background, initially, it was fresh and they tried to walk with excessive efforts, and this excessive effort turned out to be hate. Or they could not get friends. Or the fact of walking is not visible unless one records the data. They are not evaluated or encouraged by others. There are many other reasons. Anyway, people tend to walk by force initially, but walking suited to each person is important. In spite of this, it is hard to obtain professional knowledge suited to the individual physical level and health state on timely opportunity.

SUMMARY OF THE INVENTION

In consideration of the above fact, it is an object of the invention to present a step count control system capable of continuing health improvement or health maintenance by walking even alone without difficulty, and obtaining the effect of walking.

To achieve the object, the step count data control system is the means which includes step counting means for counting the number of steps, input means for entering the step count data of the step count means, recording means for recording the step count data in every specified unit entered by the input means, operating means for operating according to the step count data, and output means for issuing data, in which the step count data entered by the input means and recorded in the recording means is operated in the operating means, and the average in a specified period, the total, the target value in a specific unit, the walking distance converted from the step count, evaluation, past record and its comparison, advice, comment and other data are issued to the output means.

The step count data control system may be also comprise display memory means for storing the walking progress chart, and the walking distance is calculated on the basis of the step count data recorded in the recording means, and issued to the output means together with the walking progress chart.

Other means is a step count data output medium delivered from the step count data control system.

Further other means is a memory medium for step count data control storing a program, being a program for controlling step counting means for counting the number of steps, input means for entering the step count data of the step count means, recording means for recording the step count data in every specified unit entered by the input means, operating means for operating according to the step count data, and output means for issuing data, in which the step count data entered by the input means and recorded in the recording means is operated in the operating means, and the average in a specified period, the total, the target value in a specific unit, the walking distance converted from the step count, evaluation, past record and its comparison, advice, comment and other data are issued to the output means.

In the memory medium for step count data control, meanwhile, the display memory means for storing the walking progress chart may be controlled, and the walking distance may be calculated on the basis of the step count data recorded in the recording medium and issued to the output means together with the walking progress chart by means of the program.

BRIEF DESCRIPTION OF THE DRAWINGS

FIG. 3 is a magnified plan view of data time display area and individual display area in FIG. 2.

FIG. 4 is a magnified plan view of total display area in FIG. 2.

FIG. 5 is a magnified plan view of contrast display area in FIG. 2.

FIG. 6 is a magnified plan view of record display area in FIG. 2.

FIG. 7 is a magnified plan view of comment display area in FIG. 2.

FIG. 8 is a magnified plan view of advice display area in FIG. 2.

FIG. 9 is a magnified plan view of remark display area in FIG. 2.

FIG. 12 is a magnified plan view of data period display area and individual display area in FIG. 11.

FIG. 13 is a magnified plan view of remark display area in FIG. 11.

FIG. 17 is a magnified plan view of total display area in FIG. 11.

FIG. 18 is a magnified plan view of advice display area in FIG. 11.

DESCRIPTION OF THE PREFERRED EMBODIMENTS

Figure 1:
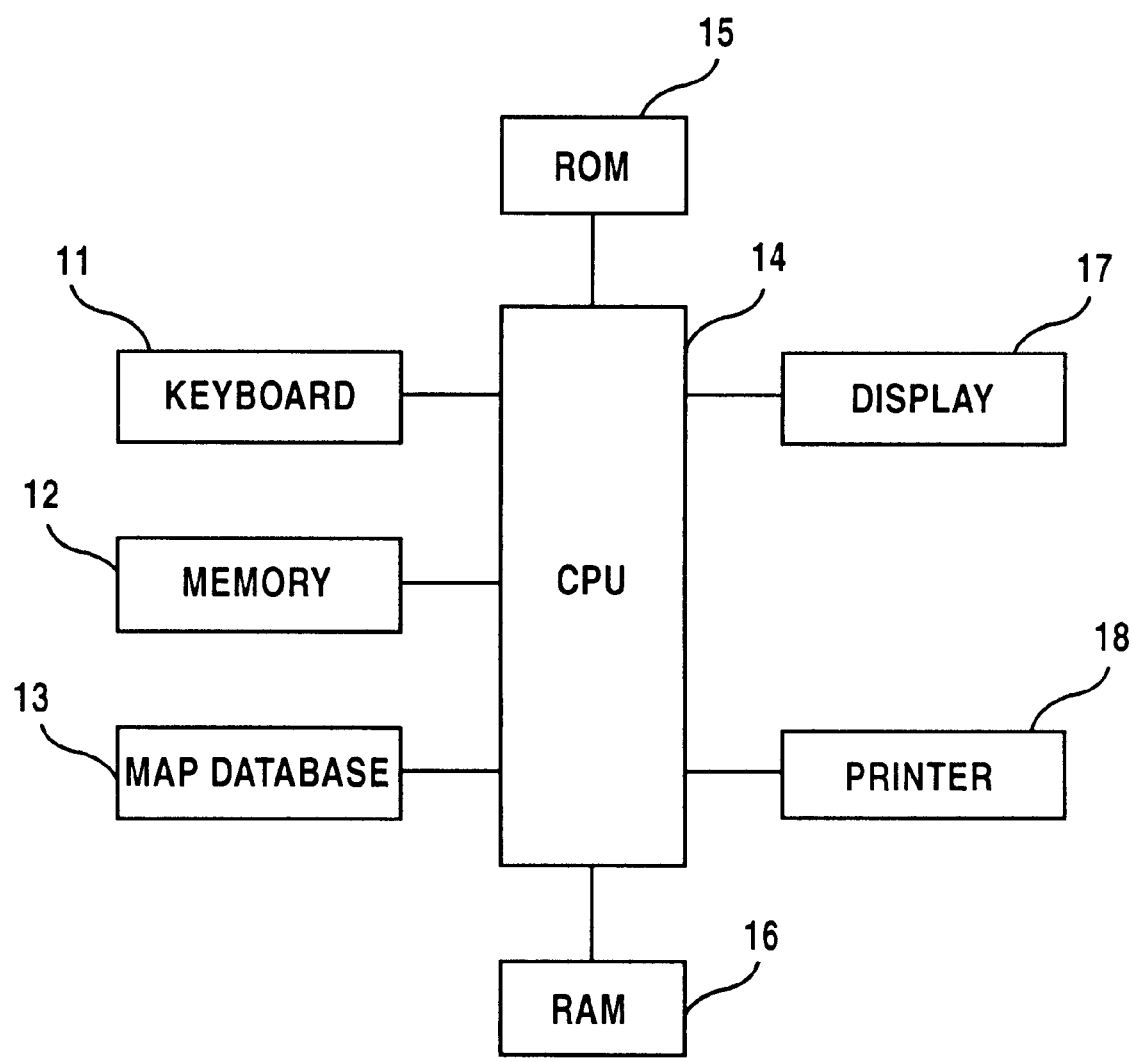
FIG. 1 is a block diagram of a control circuit of the system.

An embodiment of the invention is described below by referring to the drawings.

FIG. 1 is a block diagram of a control circuit of a step count data control system, in which a control device is composed of a personal computer.

A specific unit counted by a known pedometer, for example, daily step count data is entered through a keyboard 11. A memory device 12 stores the step count data entered from the keyboard 11, and is composed of floppy disk, hard disk, magneto-optical disk, or other external memory device. A map database 13 stores the map as the walking progress chart for objectively expressing the walking distance.

A CPU 14 executes control actin according to the program stored in a ROM 15, while a RAM 16 stores necessary fundamental data such as step length, physical level and health state, and prepared data such as advice and comment to be issued. The fundamental data may be also stored in other setting device. The operation result in the CPU 14 is issued and displayed in a display unit 17, or delivered from a printer 18.

By the operation in the CPU 14, the average in a specific period such as one month, the cumulative total, the target value of a day, the walking distance converted from the step count, objective evaluation, the comparison between the past record and the present record, professional advice, comment, the map objectively expressing the walking distance, and other necessary data are obtained.

The average in a specific period is obtained by dividing the total of the step count data entered within the specific period and stored in the memory means 12, by the number of days in the specific period stored in the RAM 16.

The cumulative total is obtained by the total of the step count data accumulated in the memory device 12 from the start until the present output.

The target value of a day is obtained in consideration of the fundamental data such as physical level stored in the RAM 16, and, if the past record is available, by reading out the past record appropriately from the memory device 12.

The walking distance is obtained by reading out the step length data as the fundamental data stored in the memory 16, reading out the total of the step count stored in the memory device 12, and calculating their product.

The objective evaluation is ranked, for example, A, B, and C, by comparison between the target value and the actual step count data.

The past record is accumulated in the memory device 12, and it is read out appropriately by the CPU 14, and is compared with the record at the present output.

The advice and comment are obtained by reading out the automatically counted continuous period, past record and others from the memory device 12, aside from the above evaluation, and comparing them and selecting by the CPU 14.

The map is a convenient chart, such as the map of Japan, showing the present position by walking from an assumed start point, and this map is stored in the map database 13. The walking distance obtained by calculating in the CPU 14 is collated with the map read out from the map database 13, and the distance from the start point to the present output point is indicated by color or the like.

The map database 13 stores the local history, products, sightseeing spots, historical sites, spas, health information, and other prepared data. By the updated walking, when reaching a specific point, the CPU 14 reads out and displays the corresponding prepared data from the map database 13. Moreover, the prepared data stored in the RAM 16 may be linked with the prepared data stored in the map database 13 so as to be utilized at the time of output of the advice or comment. The start point is not specified, but is preferably set at the user's home town or the like, and this information is also entered at the time of start. Or, in order to plot the data suited to the resident area of the user automatically, several maps may be prepared in the map database 13.

FIG. 2 to FIG. 10 are examples of output medium issued from the display unit 17 or printer 18.

Figure 2:
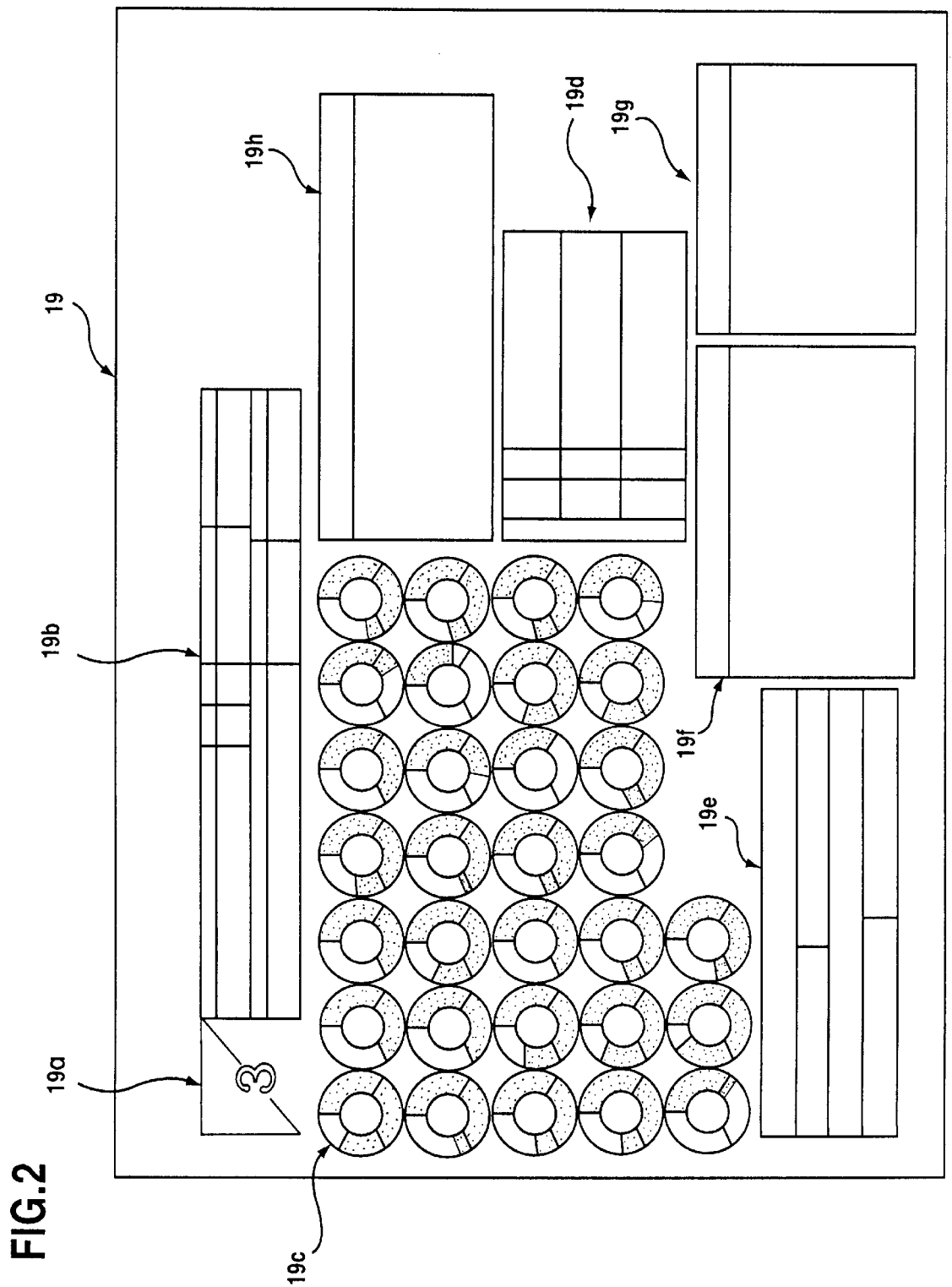
FIG. 2 is a plan view of walking data sheet as an example of output medium.

In a walking data sheet 19 in FIG. 2, the daily step count data entered for an individual user is accumulated for a month and issued. The upper main position 19a is the data period display area for specifying the month, the right side 19b is the individual display area for specifying the individual and displaying part of the fundamental data necessary for display, and the lower 19c is the record display area for displaying the daily walking record during the month. Its right side 19d is the contrast display area for comparing the past record and the current month record, the lower left 19e is the total display area for displaying the summary of the step count data, and its right side 19f and 19g are the comment display area and advice display area, and the right upper part 19h is the remark display area.

The display areas of the walking data sheet 19 in FIG. 2 are magnified and translated in English in FIG. 3 to FIG. 10.

The data period display area 19a in FIG. 3 shows the data of the month of March 1998 of this walking data sheet. The individual display area 19b shows the name of the walking individual, address, and part of Fundamental data such as sex (male), age (49), step length (60 cm), and also indicates that the target step count of a day for this month is 8500 steps. As the target step number of a day for the month, numerical values at increments of 500 steps, such as 8000, 85000 and 9000, are preliminarily stored in the RAM 16, and the target is selected in consideration of the past data.

As known from the total display area 19e in FIG. 4, this individual has started in January 1998, and this is the third month. Also as shown in FIG. 5, as indicated in the contrast display area 19d, the target value for January was 8000 steps and also 8000 steps in February, and the average of both months exceeded the target value, and hence a higher target was set for March. The target value for the starting month is set on the basis of the preliminarily stored physical level and other fundamental data, and by selecting the average value if the physical level is the average.

In the record display area 19c in FIG. 6, the daily step count data is read out from the memory device 12, and expressed in a circle diagram showing the date, step count and evaluation at a glance. For example, in the record on March 1, the target value is 8500, and the actual step count is 10500, and hence more than three-quarters of the circle diagram is painted solid. That is, by the comparison of two numerical values, 1500 and 10500, the evaluation is "A".

FIG. 5 shows the contrast display area 19d, which is expressed by numerical values and bar graph so that the past record and the current month record can be compared at a glance about the target value, average, maximum, and minimum. In the month specifying positions showing the second month back, last month, and current month, the improvement as compared with the preceding month is indicated by the direction of the arrow.

FIG. 4 shows the total display area 19e, which calculates and indicates the total step count of the month, the daily average step count of the month, and the cumulative total, that is, the total step count and the total walking distance since January 1998.

In the comment display area 19f in FIG. 7, a proper one is selected from the prepared data stored in the RAM 16, and the prepared data and the step count data recorded in the recording device 12 are combined and issued. For example, reading out the prepared data "The step count evaluation of a day is A in xx, B in xx, C in xx, and D in xx," the space of "xx" is filled with the number of days of evaluation shown in the record display area. The evaluation is A in 20 out of 31 days, and fluctuations of evaluation are small, and therefore, for example, out of the prepared data such as "Too many evaluation C or D" and "You'd better walk more constantly," the prepared data "You walk more constantly than in previous month" is read out, and seeing that evaluation is D in few days, "Try to make evaluation D zero next month" is also read out.

In the advice display area 19g in FIG. 8, on the basis of the data shown in each display area and the data of the period from the start, proper prepared data out of the prepared data stored in the RAM 18 are read out, such as "Take it easy and breathe enough when walking" and "Select shoes of good cushioning performance when walking paved road."

In the remark display area 19h in FIG. 9, proposing "Challenge to walk around Japan in a total distance of 6722 km," the encouragement Lo the future is displayed so as to achieve the goal. According to the cumulative walking distance data, for example, "You passed the city of AA this month, and are approaching the city of BB," "You'll reach the city of AA soon," "Nice walking. Go on," and others prepared data are read out from the RAM 16 and displayed.

Figure 10:
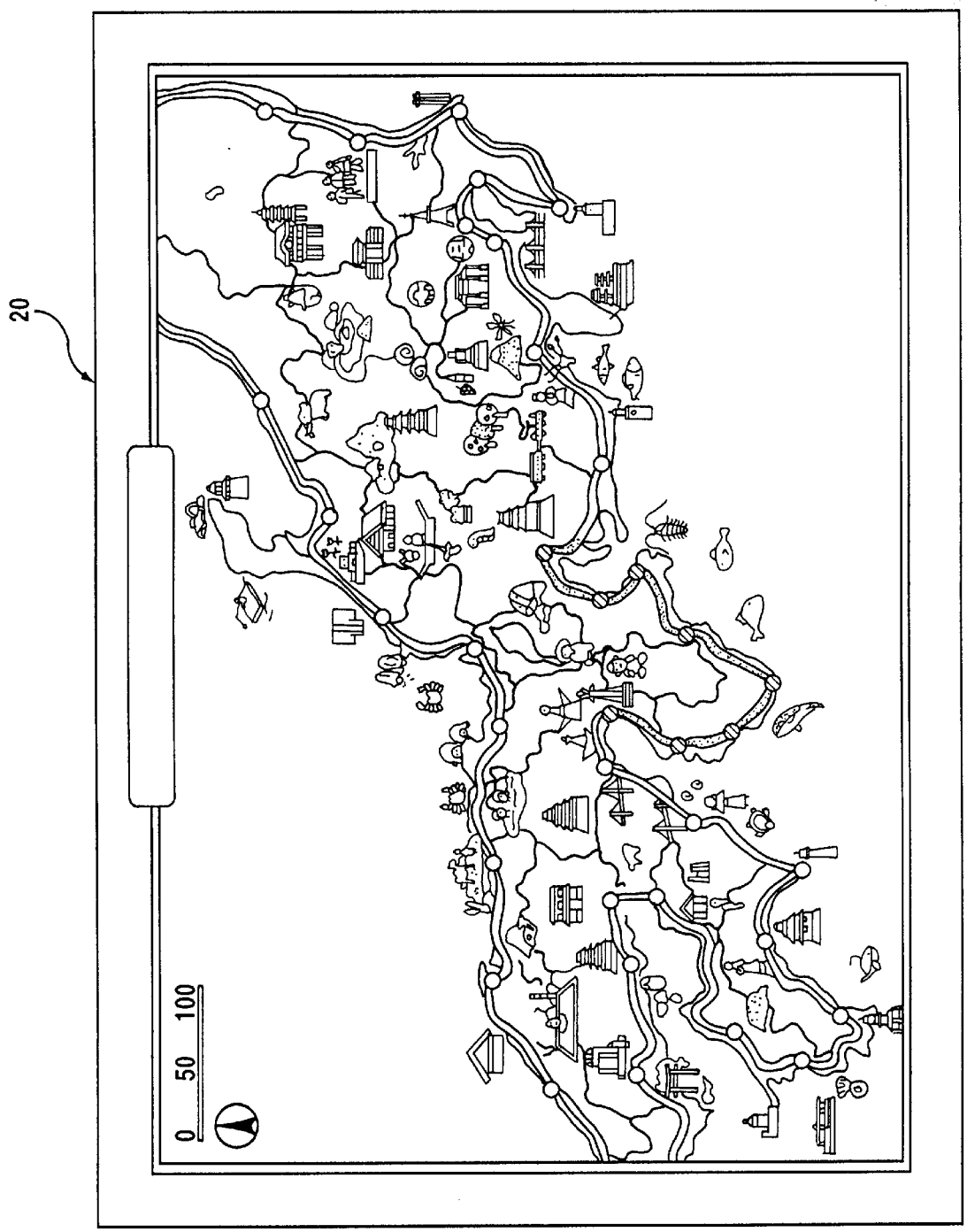
FIG. 10 is a plan view of walking map as an example of output medium.

According to the walking map 20 in FIG. 10, from the total walking distance of 463 km shown in the walking data sheet 19 in FIG. 2, starting, for example, from Osaka, it is known that you have already passed Wakayama, Tanabe, and Nagoya, and are approaching Hamamatsu, readily according to the painted color. Moreover, by the picture shown on the map, the feeling of making a trip is enjoyed. The walking map 20 in FIG. 10 shows the district of Kanto, Chubu, Kinki, Chugoku, and Shikoku, out of four districts of the land of Japan divided from north to south. Of course, the entire land of Japan may be expressed in one map, but it is more interesting in the divided map because more information can be displayed, the impression of long distance is not given, and it is not tiresome.

Figure 11:
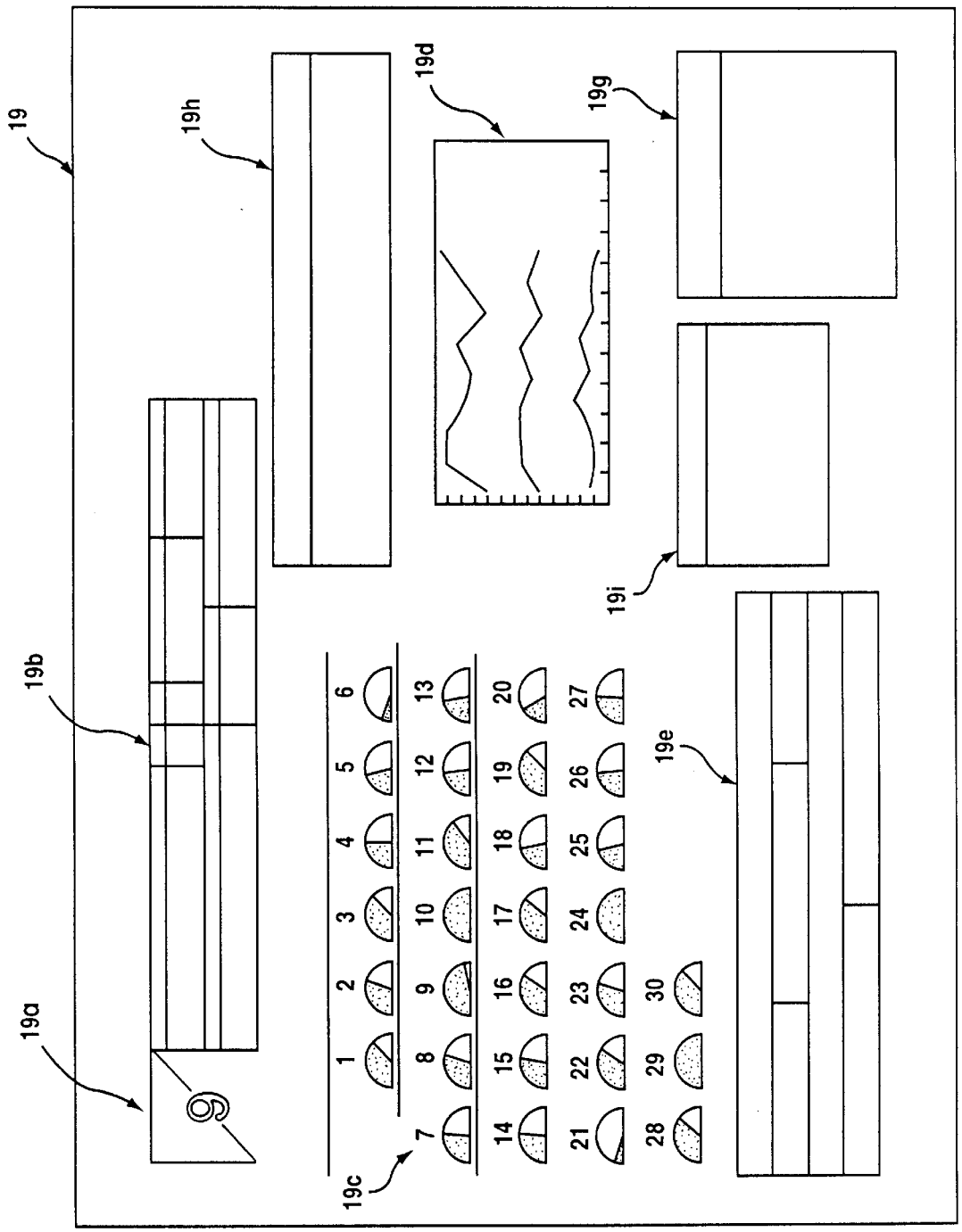
FIG. 11 is a plan view of walking data sheet as other example of output medium.

FIG. 11 is the output medium delivered from the display unit 17 or printer 18, as other example of walking data sheet 19.

In this walking data sheet 19, unlike the walking data sheet 19 shown in FIG. 2, the target step count of a day for the current month in the individual display area 19 is set according to the own declaration of the user as shown in FIG. 12. That is, the declared target value is directly entered through the keyboard 11, and stored in the RAM 16.

If this target value is always evaluated highly by the relative evaluation as explained below, a proper statement is selected, for example, "It's A-OK. Set a higher target from next month" from the prepared data stored in the RAM 16, and is shown in the remark display area 19h in FIG. 13. By thus setting the target step count of a day by oneself, the independence that is essential for continuation of action can be esteemed, and it is preferred because one can walk according to the own health condition.

Figure 14:
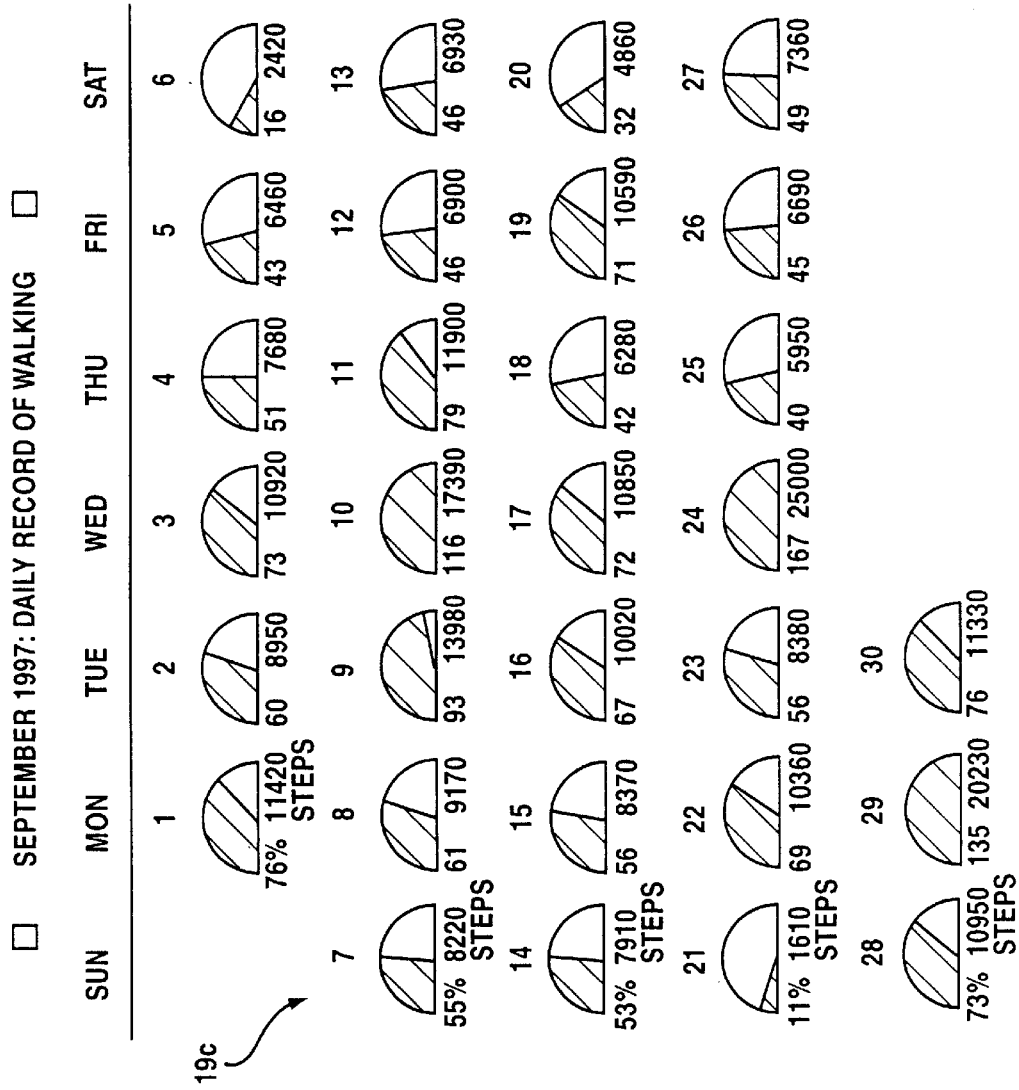
FIG. 14 is a magnified plan view of record display area in FIG. 11.

In the record display area 19c in FIG. 14, the daily step count data is read out from the recording device 12 and displayed, and the days of week are arranged laterally and the dates are arranged same as in calendar, and the step count data is displayed beneath the date. In this display of step count data, in order that the step count as compared with the target may be known at a glance, the semicircle is 100% of the target, and the corresponding rate is painted solid in a sector form. Beneath the semicircle, the step count and the rate are numerically expressed. For example, on September 1, the target is 15000 steps, and the actual walking was 11420 steps, and this step count corresponds to 76% of the target. Hence, about three-quarters of the semicircle is painted solid, and 76% and 11420 steps are displayed beneath. On September 24, the target is 1500 steps, and the actual walking was 25000 steps, which corresponds to 167%, exceeding 100%, and the entire semicircle is painted solid. The solid painted area of the semicircle and the mentioned rate are the relative evaluation based on the target, and when this evaluation is high, as mentioned above, it is urged to raise the target. Preferably, the color may be changed depending on the rate of the solid painted area.

The small character given to the right side of each semicircle is the absolute evaluation from A to E. The absolute evaluation is based on a specific numerical value calculated from the sex and age of the fundamental data of the user being stored. In this example, the user is female and 45 years old, and hence evaluation A is 11000 steps or more, evaluation B is 10999 to 8500 steps, evaluation B is 8499 to 6000 steps, evaluation D is 5900 to 3500 steps, and evaluation E is 3499 steps or less. Such evaluation reference data is read out from the memory device 12 according to the specified fundamental data, and the evaluation reference data and the daily step count data read out from the memory device 12 are compared and the evaluation is selected.

Figures 15, 16:
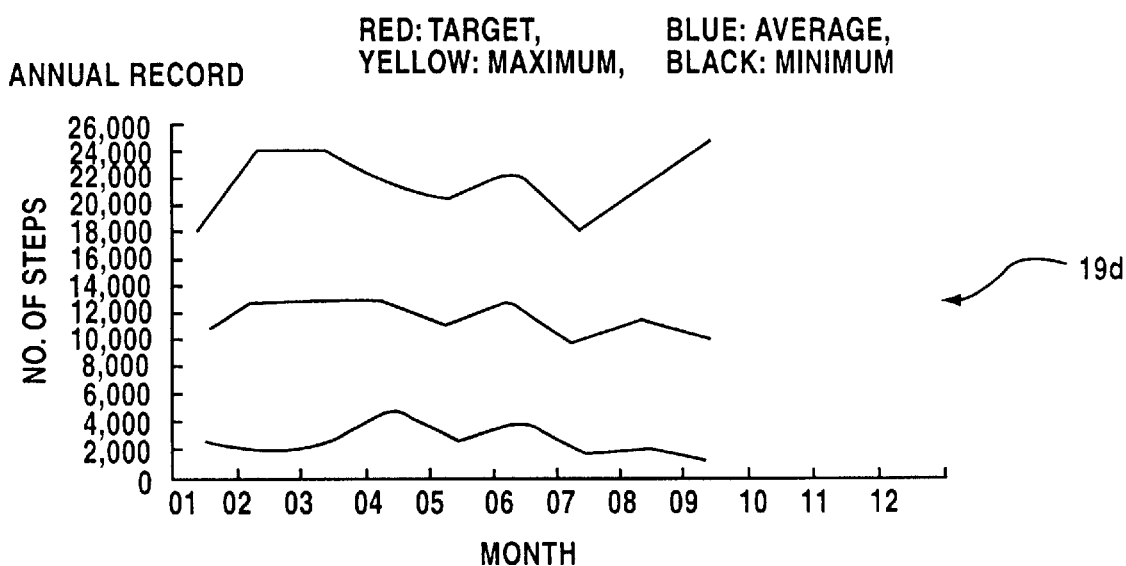
FIG. 15 is a magnified plan view of absolute evaluation table in FIG. 11.
FIG. 16 is a magnified plan view of contrast display area in FIG. 11.

It is the absolute evaluation table 19i in bar graph shown in FIG. 15 that indicates the monthly changes of evaluation at a glance.

In the contrast display area 19d shown in FIG. 16, different from the example in FIG. 2, "the current month fast walking time total" is displayed. In this example, aside from the step count data, the fast walking time data showing the time of fast walking effective for aerobic exercise is entered at the same time. Fast walking is walking faster than usual, generally about 120 to 130 steps a minute. The fast walking time data is stored in the memory device 12 together with the daily step count data.

To obtain the total walking distance incorporating the fast walking time data, for example, to the product of the step count and step length of normal walking, the product of the step count of fast walking and the step length added with a specific amount, for example, 10 cm is added. As mentioned above, since the fast walking speed is 120 to 130 steps a minute, for example, one minute may be calculated as 125 steps. That is, the product of the fast walking time data in the unit of minute and 125 is the step count in fast walking, and when the step count of fast walking is subtracted from the step count data, the step count of normal walking is obtained.

Aside from such fast walking, in order to perform aerobic exercise more securely, for example, the pulse rate data may be obtained and utilized.

Incidentally, in the advice display area 19g in FIG. 18, "B.M.I." refer to the "Body Mass Index." This value is obtained by reading out the body weight and height out of the stored fundamental data, and dividing the body weight by the square of the height expressed in the unit of meter. Depending on the numerical value, the required calories and corresponding eating life model pattern and others are advised.

Managing the step count data thus obtained by walking, necessary data is issued in a desired form, and the progress situation is objectively displayed on the map according to the actual walking, and the number of steps and distance being walked are recorded and left as the result, and the fact of walking is visible not only for the own but also for the others. Therefore, the user is encouraged mentally and urged to continue. By the output of the evaluation and comment, the user is encouraged and inspired, and further effects are expected.

Further by properly setting the target value in the specified unit, it is only enough to walk so as to approach it, and the user knows a kind of guideline depending on the physical condition, and it is easier to walk. By the output of the advice, the professional knowledge may be given timely, and safe walking without accident is assured.

Not limited to the individual use, for example, when plural colleagues of a company participate, a kind of competition occurs, which contributes greatly to the promotion of continuation.

Still more, by the output of the map showing the walking distance objectively and simply, the actual distance being walked is known at a glance, and the actual feel is given and the interest is aroused. As a result, the continuation promoting effect is further enhanced. If the walking distance table is a map, one feels like traveling, and the local history and products and health information are added as data at each point, the effect is further improved.

The utility of the pedometers long neglected may be enhanced, the demand of pedometers is increased, and development of pedometers of higher precision may be urged, among other effects.

The keyboard 11 in the embodiment corresponds to the input means in the invention, and similarly, the memory means 12, to the recording means, the map database 13, to the display memory means, the CPU 14, ROM 15, RAM 16, to the operating means, and the display unit 17 and printer 18, to the output means, respectively, but the invention is not limited to the constitution of the illustrated embodiment alone, but may be applied according to the technical concept described the claims.

The step count data from the pedometer may be also entered directly by digital signal without using keyboard 11, and the display memory means may set, aside from the around-Japan map, other maps such as the North American crossing course, silk road course, around-the-world course, European content crossing course, other continent crossing course, and polar expedition, and also imaginary maps, or proper image drawing and schematic diagrams.

I claim:

1. A step count data control and display system comprising:

step counting means for counting a number of steps;

input means for entering step count data from said step counting means;

first memory means for recording current and past step count data entered by said input means;

second memory means for storing data on personal attributes of one or more users including a user's average length of step, past performance, distance between two or more locations, and comments related to a user's performance;

controller means under control of software and using said step count data from said first memory means and data from said second memory means for calculating an output comprising one or more of the following:

cumulative total number of steps;

target value of number of steps for a specified period;

walking distance converted from said step count data; and comparison of past and current step count data; and display means for displaying said output from said controller means together with comments taken from said second memory means and related to personal performance of such output for the user.

2. The system of claim 1, wherein said walking distance is displayed on a map displayed by said display means and showing objective walking distance between two locations therein.

3. The system of claim 1, wherein said display means comprises a printer for printing out said output.

4. The system of claim 1, wherein said display means comprises third memory means for storing walking distance progress chart; and wherein walking distance as calculated by said controller means based on step count data recorded in said first memory means is caused to be displayed in said display means.

* * * * *